3,133,862
BUCCAL TABLET CONTAINING VITAMIN A AND SODIUM PROTEINATE
Irving B. Wershaw and Ernest G. Kuehns, New York, N.Y., assignors, by mesne assignments, to Miles Laboratories, Inc., Elkhart, Ind., a corporation of Indiana
No Drawing. Filed July 22, 1960, Ser. No. 44,562
3 Claims. (Cl. 167—81)

This invention relates to buccal tablets containing vitamin A with or without vitamin C for oral administration.

Buccal tablets containing vitamin A are used in the treatment of oral leukoplakia and lichen planus. Prime desiderata of such tablets containing vitamin A are that they (1) dissolve very slowly, ensuring constant bathing of the buccal mucosa with vitamin A and effective systemic utilization of the vitamin A; (2) have a pleasant taste and odor notwithstanding the unpleasant taste of vitamin A; (3) have a relatively high concentration of vitamin A per tablet, preferably from about 50,000 to 150,000 USP units (particularly preferred are tablets having a concentration of about 75,000 USP units or more per tablet); (4) are chemically stable for relatively long periods of time of the order of at least three months, preferably longer, so that the tablets will not lose their vitamin A potency during storage in stoppered bottles or other closed containers before reaching the consumer; and (5) are relatively firm and hard.

Hardness is usually determined by ascertaining the pressure which the tablets will withstand when tested by the well known Stokes tablet hardness tester in which the tablet is placed on its edge between the anvil and plunger, centered perpendicular to the pressing surfaces, and pressure applied at a slow constant rate until the tablet breaks. The reading of the pressure in kilograms per square centimeter required to fracture the tablet is the hardness value of the tablet. The buccal tablets of the present invention have a hardness of 14 or higher by this test; a hardness value of 14 by this test is considered excellent.

The test commonly used in this art for determining the rate of dissolution of the tablet is to place specimens of the tablet under test in water at 37° C. and ascertain the time required for each tablet to disintegrate to the point at which it falls apart or dissolves. Tablets having a rate of dissolution as determined by this test of at least 30 minutes are considered satisfactory.

In the copending application Serial No. 751,138 filed July 28, 1958, now Patent No. 2,949,401 granted August 16, 1960, of one of the applicants of this application is disclosed and claimed a buccal tablet combining to an exceptional and unusual extent the above-noted properties, which tablet contains from 10% to 20% of vitamin A acetate, from .3% to .4% of citric or tartaric acid, from 3% to 5% of methyl cellulose, from 0% to 0.2% of ascorbic acid, and from 74% to 86% of a filler, which preferably is a mixture of lactose and sucrose, but may be starch, glucose, gelatin or other suitable fillers. Such tablets containing carbohydrates are objectionable for administration to parties having abnormal blood sugar levels, for examples, diabetics, in that, as is well known, their diet should be free or substantially free of carbohydrates. A further objection to such tablets, containing carbohydrates is that the presence of carbohydrates in the mouth over prolonged periods of time frequently results in tooth decay and cavity formation.

It is a principal object of the present invention to provide a buccal tablet free of carbohydrates and which combines the above-noted desirable properties of buccal tablets to an exceptional extent. Other objects and advantages of this invention will be apparent from the following detailed description thereof.

In accordance with this invention, the buccal tablets contain from 75% to 85% by weight of sodium proteinate, from 5% to 20% preferably 10% to 15% by weight of vitamin A acetate, from 2% to 4% by weight of tricalcium phosphate, and from 2% to 8% by weight of cellulose. The tablet may also contain flavoring material such as citric acid, tartaric acid, peppermint flavor or other flavoring material, and a small amount of ascorbic acid, from 0% to 0.2%, whenever a tablet is desired containing vitamin C as well as vitamin A. As noted, the invention contemplates tablets containing no vitamin C but only vitamin A.

As the vitamin A constituent of the tablet, vitamin A acetate is employed. Vitamin A acetate is available commercially under the name Vitamin A Crystalets in powdered form. The vitamin A acetate is compatible with the other constituents of the tablet and when compounded with these other constituents, remains chemically stable in the tablet for long periods of time, at least several months.

The tricalcium phosphate may be any commercial food-grade tricalcium phosphate. The cellulose used is pure alpha cellulose of commerce such, for example, as the Solka Floc sold by the Brown Company.

Sodium proteinate employed as the major constituent of the tablet is obtained from soy bean flour. It is produced, for example, by dehulling soy beans, milling the dehulled soy beans to produce soy bean flour or powder, extracting the flour with an organic solvent such as ether, chloroform, hexane or other petroleum fraction to remove fats, extracting the defatted soy bean flour with water, precipitating protein from the water extract by treatment with food-grade hydrochloric acid, and neutralizing the precipitate with food-grade sodium hydroxide. The sodium proteinate thus produced, after subjection to a water wash, is dried, for example, by spray-drying to produce a powder having an off-white color, a bland taste and which is water-dispersible. Such powders contain:

| | Percent |
|---|---|
| Protein | 85 to 90 |
| Sodium, which is chemically combined with protein | 1.2 |
| Moisture | 5 to 10 |
| Ash | 3.8 to 8.2 |

The powder may have a small amount of fiber present, of the order of about 0.5%.

The chemical composition of a commercially available sodium proteinate is as follows:

| | Percent |
|---|---|
| Protein | 86.7 |
| Sodium | 1.2 |
| Moisture | 6.2 |
| Ash | 5.3 |
| Fiber | 0.6 |

This sodium proteinate has a pH of 7.6 and a density of 27 pounds per cubic foot.

We have found that such sodium proteinates derived from soy bean flour are compatible with vitamin A acetate, and when mixed with tricalcium phosphate and cellulose in the proportions of 75% to 85% sodium proteinate, 5% to 20%, preferably 10% to 15% vitamin A acetate, 2% to 4% tricalcium phosphate, and 2% to 8% cellulose, the mixture granulated, and the granules pelleted, form tablets which combine to an unusual and exceptional extent the desirable properties of buccal tablets hereinabove set forth and, being free of carbohydrates, are eminently satisfactory for administration to individuals requiring carbohydrate-free diets. These buccal tablets have the further advantage that being carbohydrate-free, they do not give rise to the problem of tooth decay and/or the formation of dental cavities.

The buccal tablet of this invention when subject to the above-mentioned disintegration test disintegrates in an hour or longer. Their hardness is at least 14 kilograms per square centimeter, usually about 15 kilograms per square centimeter, determined by the hardness test above set forth. They have a pleasant taste and odor. They may be made to contain any desired relatively high concentration of vitamin A per tablet depending upon the amount of vitamin A acetate incorporated in the tablet. They are chemically stable and can be stored for relatively long periods of time in stoppered bottles or other closed containers without degradation during storage.

In producing the buccal tablet of this invention, the sodium proteinate is first granulated by admixture with ethanol or isopropyl alcohol and water in amounts sufficient to wet the sodium proteinate flour. The liquid thus used may contain about 75% of the alcohol and 25% water. The amount of alcohol-water mixture used is not critical, provided enough is used to adequately wet the sodium proteinate; preferably about one part of liquid is used for about four parts of sodium proteinate. The wet proteinate is then screened and dried. The dried sodium proteinate is first screened and then granulated in a conventional granulating machine. To the granules thus produced is added the cellulose and the tricalcium phosphate in finely divided form, for example, a particle size such that all particles pass through a 40-mesh screen. The vitamin A acetate is added to the resultant mixture, the mixture agitated, and the mixture thus produced compressed to produce tablets of the desired size, e.g., a tablet of about 2½ grams, using a conventional tableting machine such as the well known Stokes machine. It will be appreciated that the above description is exemplary of a preferred mode of producing the tablets and the present invention is not limited thereto.

The following example is given to illustrate one embodiment of the invention. It will be appreciated that the invention is not limited to this example.

192 grams of sodium proteinate (the commercial grade hereinabove described) are mixed with about 50 grams of a mixture consisting of 75% isopropyl alcohol and 25% water, the mixture passed through a No. 6-mesh screen, placed on trays, and dried at 110° F. The dried material is then passed through a No. 16-mesh screen and the screened material granulated in a conventional granulating oscillator. To the resultant granules are added 8 grams of tricalcium phosphate (passed through a 40-mesh screen) and 12 grams of alpha cellulose. To this mixture is added 32 grams of vitamin A acetate containing 500,000 USP units of vitamin A per gram. This mixture is tabulated in a Stokes tableting machine producin tablets weighing 2.5 grams. The composition of each tablet is as follows:

| | Percent |
|---|---|
| Vitamin A acetate | 13 |
| Sodium proteinate | 80 |
| Tricalcium phosphate | 3 |
| Cellulose | 4 |
| Total | 100 |

The resultant tablets have a pleasant, bland taste, a rate or dissolution of about 60 minutes, and a hardness of about 15.

It will be noted that the present invention provides a buccal tablet which has a pleasant taste, which disintegrates slowly in the mouth requiring about an hour so to do, thus ensuring constant bathing of the buccal mucosa and effective systemic utilization of the vitamin A, which is free of carbohydrates and thus can be administered in cases requiring carbohydrate-free diets, and in which the unpleasant taste of vitamin A acetate is greatly minimized, if not completely eliminated. The latter is accomplished by masking of the taste of the vitamin A acetate by the other constituents of the tablet and by the slow release of the vitamin A acetate in the mouth as the tablet slowly dissolves so that the amount of relatively free vitamin A acetate in the mouth at any instant is not sufficient to cause an unpleasant taste.

In this specification, all percentages are on a weight basis; screen sizes are United States Bureau of Standards, standard screen sizes.

Since certain changes may be made in the buccal tablet of this invention and since the composition thereof may be varied somewhat without departing from the scope of this invention, it is intended that all matter contained in the above description shall be interpreted as illustrative and not in a limiting sense.

What is claimed is:

1. A buccal tablet which disintegrates slowly when placed in the mouth and which consists essentially of a thorough admixture of from about 75% to about 85% by weight of sodium proteinate derived from soy bean flour and containing from 85% to 90% by weight of protein, from about 5% to about 20% by weight of vitamin A acetate, from about 2% to about 4% by weight of tricalcium phosphate, and from about 2% to about 8% by weight of cellulose.

2. A buccal tablet as defined in claim 1, in which the sodium proteinate is derived from soy bean flour by extracting the flour with an organic solvent to remove fats, extracting the defatted flour with water, precipitating protein from the water extract by treatment with hydrochloric acid, neutralizing the precipitate with sodium hydroxide solution to produce a solution of sodium proteinate, and recovering the sodium proteinate from this solution.

3. A buccal tablet which disintegrates slowly when placed in the mouth and which consists essentially of a through admixture of about 80% by weight of sodium proteinate derived from soy bean flour and containing from 85% to 90% by weight of protein, about 13% by weight of vitamin A acetate, about 3% by weight of tricalcium phosphate, and about 4% by weight of cellulose.

References Cited in the file of this patent

UNITED STATES PATENTS

| 980,292 | Lampe | Jan. 3, 1911 |
| 2,668,766 | Becket et al. | Feb. 9, 1954 |

FOREIGN PATENTS

| 213,736 | Australia | Apr. 26, 1956 |